US006336956B1

(12) United States Patent
Moreau et al.

(10) Patent No.: US 6,336,956 B1
(45) Date of Patent: Jan. 8, 2002

(54) PROCESS FOR SEPARATING NITROGEN FROM LESS POLAR COMPOUNDS

(75) Inventors: Serge Moreau, Velizy-Vilacoublay; Bernard Sardan, Plaisir, both of (FR)

(73) Assignee: L'Air Liquide, Societe Anonyme pour l'Etude et l'Exploitation des Procedes Georges Claude, Paris Cedex (FR)

(*) Notice: Subject to any disclaimer, the term of this patent is extended or adjusted under 35 U.S.C. 154(b) by 1121 days.

(21) Appl. No.: 08/718,696

(22) Filed: Sep. 27, 1996

Related U.S. Application Data

(63) Continuation of application No. 08/463,744, filed on Jun. 5, 1995, now abandoned.

(30) Foreign Application Priority Data

Mar. 24, 1995 (FR) .............................................. 95 03503

(51) Int. Cl.⁷ .............................................. B01D 53/047
(52) U.S. Cl. .............................................. 95/96; 95/130
(58) Field of Search .......................... 95/96–103, 106, 95/130

(56) References Cited

U.S. PATENT DOCUMENTS

| | | | | |
|---|---|---|---|---|
| 3,140,932 A | * | 7/1964 | McKee ........................ | 95/130 |
| 3,140,933 A | * | 7/1964 | McKee ........................ | 95/130 |
| 3,973,931 A | * | 8/1976 | Collins ..................... | 95/130 X |
| 4,557,736 A | * | 12/1985 | Sircar et al. ............. | 95/130 X |
| 4,859,217 A | * | 8/1989 | Chao ......................... | 95/130 |
| 4,925,460 A | * | 5/1990 | Coe et al. ................. | 95/130 X |
| 5,152,813 A | * | 10/1992 | Coe et al. ................. | 95/103 |
| 5,174,979 A | * | 12/1992 | Chao et al. ............... | 95/130 X |
| 5,248,322 A | * | 9/1993 | Kumar ...................... | 95/130 X |
| 5,258,060 A | * | 11/1993 | Gaffney et al. ........... | 95/130 X |
| 5,268,023 A | * | 12/1993 | Kirner ...................... | 95/130 X |
| 5,354,346 A | * | 10/1994 | Kumar ...................... | 95/130 X |
| 5,354,360 A | * | 10/1994 | Coe et al. ................. | 95/130 X |
| 5,413,625 A | * | 5/1995 | Chao et al. ............... | 95/130 X |
| 5,453,112 A | * | 9/1995 | Sinicropi et al. ......... | 95/130 X |
| 5,454,857 A | * | 10/1995 | Chao ......................... | 95/96 |
| 5,464,467 A | * | 11/1995 | Fitch et al. ............... | 95/130 X |
| 5,470,378 A | * | 11/1995 | Kandybin et al. ........ | 95/130 X |

FOREIGN PATENT DOCUMENTS

| | | |
|---|---|---|
| EP | 0122874 | * 10/1984 |
| EP | 0 122 874 | 10/1984 |

OTHER PUBLICATIONS

R. M. Barrer, "Zeolites and Clay Minerals as Sorbents and Molecular Sieves", 1978, Academic Press, London, pp. 107, 121, 123, 132–135, 138, 164, 166, 175 and 208, 1978.

R.M. Barrer, "Zeolites and Clay Minerals as Sorbents and Molecular Sieves," 1978, Academic Press, London, pp. 107,121,123,132–135,138,164,166,175 and 208.*

M. Suzuki, "Pressure Swing Adsorption", Adsorption Engineering, 1990, Elsevier, Tokyo, pp. 245–249.*

R. Yang, "Gas Separation by Adsorption Processes", pp. 262–267 (Undated).*

D. Ruthven, "Principles of Adsorption and Adsorption Processes", 1987, pp. 364–371.*

D. Ruthven et al., "Pressure Swing Adsorption", Chapter 1, (Undated).*

* cited by examiner

*Primary Examiner*—Robert H. Spitzer
(74) *Attorney, Agent, or Firm*—Young & Thompson

(57) ABSTRACT

Process for separating nitrogen from a gas mixture containing nitrogen and at least one gas which is less polar than nitrogen, and employing a differential gas adsorption technique, called PSA process, using an adsorbent of zeolite type, according to which the PSA process is used at a temperature of at least 40° C. by employing as adsorbent a zeolite whose nitrogen adsorption isotherm at 20° C. exhibits a curvature characterized by a parameter C defined by the formula:

$$C = \frac{P_1 q(P_2)}{P_2 q(P_1)}$$

where $q(P_1)$ denotes the quantity of nitrogen adsorbed at pressure $P_1$ and $q(P_2)$ that adsorbed at pressure $P_2$, and the pressures $P_1$ and $P_2$ are defined respectively from the high and low pressures of the PSA cycle in question, C being equal to at least 2.5.

4 Claims, 5 Drawing Sheets

PROCESS FOR SEPARATING NITROGEN FROM LESS POLAR COMPOUNDS

This application is a continuation of application Ser. No. 08/463,744, filed Jun. 5, 1995, now abandoned.

FIELD OF THE INVENTION

The present invention relates to a new process for separating nitrogen from a gas mixture containing less polar gases.

The separation of the gases in air into nitrogen and oxygen, plus argon, is an established technique which makes use of the differential adsorption properties of gases on zeolite molecular sieves. The process universally recognized is the PSA or "Pressure Swing Adsorption", which employs pressure differences in order to:

1- adsorb nitrogen at high pressure in order to enrich the gas phase in oxygen,
2- desorb nitrogen at low pressure in order to regenerate the adsorption properties of the zeolite.
3 types of PSA process are distinguished:
  those where the high pressure is higher than atmospheric pressure and the low pressure is higher than or equal to atmospheric pressure; for example, a high pressure of approximately 3 b (bars) absolute and a low pressure of approximately 1 b (so-called superatmospheric or PSA scheme);
  those where the high pressure is higher than atmospheric pressure, for example of the order of 1.5 b, and the low pressure is lower than atmospheric pressure, for example the order of 0.5 b (so-called transatmospheric scheme or Vacuum Pressure Swing Adsorption);
  finally, those where the high pressure is lower than 1.2 b and the low pressure is lower than atmospheric pressure, for example a high pressure of approximately 1.1 b and a low pressure of approximately 0.25 b (subatmospheric scheme or Vacuum Swing Adsorption).

In the present specification reference to a PSA process will be used to denote these three types of process, without discrimination.

PRIOR ART

The adsorbents described in the prior art for making use of the PSA processes aiming at the separation of nitrogen from a gas mixture containing nitrogen are essentially zeolites of type A or X, exchanged with alkali or alkaline-earth metal cations or some other divalent cations. Thus,
  patent McKee U.S. Pat. No. 3,140,932 describes the use of zeolites CaX (zeolite X exchanged with Ca cations), SrX, BaX and NiX,
  patents McKee U.S. Pat. No. 3,140,933, Chao U.S. Pat. No. 4,859,217 and Kirner U.S. Pat. No. 5,268,023 recommend the use of zeolites LiX,
  patents Coe U.S. Pat. No. 5,152,813 and Chao U.S. Pat. No. 5,174,979 describe the use of a zeolite X exchanged with Li and Ca,
  patent Coe U.S. Pat. No. 5,258,058 recommends the use of a zeolite X exchanged with Li plus a cation from the list Ba, Co, Cu, Cr, Fe, Mg, Mn, Ni, Zn.

The literature abounds with studies concerning the adsorption of the gases from air on zeolites 5A (see, for example, the general works: D. M. Ruthven "Principles of adsorption and adsorption processes" 1987, John Wiley & Sons 1984; R. T. Yang "Gas separation by adsorption processes", Butterworths 1987; R. M. Barrer "Zeolites and clay minerals as sorbents and molecular sieves", Academic Press 1978; M. Suzuki "Adsorption Engineering", 1990).

The choice of the adsorbent is based on the ability of the zeolite to adsorb much nitrogen at high pressure and to desorb much thereof when the pressure is lowered; this differential adsorptivity (or "breathing") defines the gas quantity treated at each cycle, and therefore the productivity.

Zeolites other than A and X have hitherto been considered to be generally unsuitable for the separation of nitrogen by PSA because of the excessively high curvature of the isotherm, which prevents desorption at low pressure. Thus, patent Coe U.S. Pat. No. 4,925,460 clearly explains that Ca-chabazite is unsuitable for use in PSA, the form of the isotherm being unsuitable. Patent Leavitt U.S. Pat. No. 5,074,892 also describes very well the need to minimize the nitrogen adsorptivity at the low pressure of the cycle.

Thus, the state of the art recommends choosing the zeolites on the basis of a nitrogen adsorptivity which is as high as possible at the high pressure of the cycle and as low as possible at the low pressure of the cycle.

Besides the nitrogen adsorptivity, another determining factor for qualifying a high-performance zeolite in a PSA process is its adsorptivity differentiating between nitrogen and oxygen, that is its selectivity. This selectivity is expressed by the relationship:

$$S = q_{N2}/q_{O2} * P_{O2}/P_{N2}$$

where $q_{N2}$ denotes the quantity of nitrogen adsorbed at the nitrogen partial pressure $P_{N2}$,
  and $q_{O2}$ denotes the quantity of oxygen adsorbed at the oxygen partial pressure $P_{O2}$.

In the light of the criteria of nitrogen adsorptivity and of selectivity it has hitherto been considered that only zeolites A, X and chabazites exchanged with lithium were capable of being used in a PSA process on industrial scale.

In the present state of the art the selectivity is a quantity which is very difficult to calculate.

A known means for improving the adsorptivity of a zeolite consists in lowering the adsorption temperature.

For example, Patent EP 122,874 describes the production of oxygen from air by a PSA process employing a zeolite NaX at a temperature below the ambient. When compared with the usual zeolites 5A employed at ambient temperature, this process makes it possible to obtain an increase in the performance of the PSA process by lowering the temperature to −30° C.

Other publications show the advantage of low temperatures, for example Izami et al. "High efficiency oxygen separation with low temperature and low pressure PSA", AIChE, San Francisco, November 1989, where measurements of performances of 5 zeolites in PSA are described as a function of temperature, with determination of an optimum between 0° C. and −15° C., according to the zeolite.

U.S. Pat. No. 3,973,931 makes it possible to ascertain that a low temperature can be reached spontaneously in a column in PSA operation.

U.S. Pat. No. 5,169,413 describes another PSA process operating below the ambient temperature with zeolites.

It thus appears that zeolites can be profitably employed at temperatures below the ambient (20° C.). In the works referred to-above, by Ruthven (pages 342, 343 and 362), Barrer (pages 103–158), Suzuki (page 36) and Yang (pages 26–44), it is even indicated that the adsorptivity of zeolites decreases when the temperature increases.

Furthermore, from the prior art it also emerges that, in general, there is a tendency to systematically set aside the idea of employing a zeolite exhibiting a nitrogen adsorption isotherm with a curvature that would be relatively high.

In the present specification it is chosen to represent said curvature by the parameter:

$$C = \frac{P_1 q(P_2)}{P_2 q(P_1)}$$

where $q(P_1)$ denotes the quantity of nitrogen adsorbed at pressure $P_1$ and $q(P_2)$ that adsorbed at pressure $P_2$; and the pressures $P_1$ and $P_2$ are defined respectively from the high and low pressures of the PSA cycle in question.

Thus, $P_1$ is defined from the partial pressure of the nitrogen contained in a gas mixture, such as air, at the high pressure of the cycle. For example, for a cycle high pressure of 1.1 b, $P_1=1.1\times0.78=0.858$ (the nitrogen-containing gas mixture in this case being air; the molar concentration of nitrogen in air being 78%).

$P_2$ is defined from the partial pressure of the nitrogen contained in a given gas mixture, at the low pressure of the cycle. This gas mixture usually consists of the residual gas leaving the bed of adsorbent after desorption. For example, for a cycle low pressure of 0.35 b and a residual gas in which the molar concentration of nitrogen is 50%, $P_2=0.5\times0.35=0.175$.

Each adsorbent works at high and low pressures which depend on the cycle used and on the actual nature of the adsorbent. A person skilled in the art is capable, relying on his/her knowledge alone, of optimizing said pressures, this being for each adsorbent and cycle used.

In practice the high and low pressure are imposed by criteria such as:

utilization pressure of the oxygen produced, in the case of the high pressure;

technical limitations related to the plant intended to make use of the process, in particular blowers, compressors and vacuum pumps;

minimizing of the energy consumption.

SUMMARY OF THE INVENTION

However, the Applicant Company has now discovered, quite surprisingly, that some zeolites that cannot be utilized on an industrial scale for separating air and nitrogen in the usual temperature conditions employed in the PSA processes, namely a temperature lower than or equal to the ambient temperature, can be advantageously employed, provided that the PSA process is used at a temperature above the ambient, more precisely at a temperature of at least 40° C.

The zeolites with the use of which the present invention is concerned are zeolites exhibiting a relatively high curvature at 20° C., more precisely a curvature which corresponds to a value of the parameter C, defined above, which is higher than or equal to 2.5.

Thus, according to one of its essential characteristics, the present invention relates to a process for separating nitrogen from a gas mixture containing nitrogen and at least one gas which is less polar than nitrogen, and employing a technique of differential adsorption of the gases, called PSA process, using an adsorbent of zeolite type, in which said PSA process is used at a temperature of at least 40° C., employing as adsorbent a zeolite whose nitrogen adsorption isotherm at 20° C. exhibits a curvature which is characterized by a parameter C defined by $$C = \frac{P_1 q(P_2)}{P_2 q(P_1)}$$

where $q(P_1)$ denotes the quantity of nitrogen adsorbed at pressure $P_1$ and $q(P_2)$ that adsorbed at pressure $P_2$; and the pressures $P_1$ and $P_2$ are defined respectively from the high and low pressures of the PSA cycle in question, C being at least equal to 2.5.

The zeolites usable for making use of the process of the invention are any zeolites in the case of which the parameter C determined at 20° C. is higher than 2.5.

According to a particularly advantageous alternative form of the invention the process will be used at a temperature of between 40 and 70° C.

The process according to the invention makes it possible to employ zeolites which have hitherto been rejected in PSA usage because of the excessive curvature of their nitrogen isotherm.

We can mention, for example, mordenites, chabazites, offretites, erionites, ferrierites, faujasites, especially of X or Y type, zeolites A and clinoptilites.

Among the zeolites which are suitable in the context of the present invention, those advantageously chosen will be zeolites, preferably zeolites A or X or chabazites exchanged with at least one polarizing cation to an exchange ratio of at least 50%, the parameter C of which is as defined above.

These zeolites are advantageously exchanged to at least 50% with a polarizing cation, preferably a cation at least as polarizing as barium.

By way of example of a polarizing cation usable for exchanging the zeolites of the invention there will be mentioned alkali metals such as Li, alkaline-earth metals such as Ca and Sr, Ag, Cu, Cr, Fe, Mg, Mn, Ni, Zn and mixtures thereof. Such mixtures may consist more particularly of mixtures of Li with one of Ca, Sr, Ag, Cu, Cr, Fe, Mg, Mn, Ni and Zn. Within the scope of the present invention Ca is a preferred polarizing cation.

As seen above, the zeolites are exchanged to an exchange ratio of at least 50% with polarizing cations, but this exchange ratio will be advantageously higher than this minimum threshold of 50%.

Thus, in the case of zeolites A, the exchange with a polarizing cation will be advantageously made to a ratio of at least 75%.

In the case of zeolites of faujasite type, exhibiting an Si/Al ratio lower than 1.5 and more particularly equal to 1, that is essentially zeolites X, the exchange with the polarizing cation will be advantageously made to a ratio of at least 60%, preferably higher than 75%.

In general, the results obtained will be proportionately better the higher the exchange ratio.

The process of the present invention applies to any gas separation processes, where the intention is to separate nitrogen from less polar gases.

It thus applies to the processes for separating hydrogen and nitrogen included in a gas mixture and, very particularly, to the processes for separating oxygen and nitrogen included in a gas mixture, essentially air, especially with a view to the production of oxygen.

The PSA process can be used with differential pressures which are those usually employed in all the processes for separating the gases in air into nitrogen and oxygen and relying on the differential properties of adsorption of the gases on zeolites.

The only difference relating to the use of the process of the invention when compared with the conventional PSA processes is the temperature at which the adsorptions and desorptions on the zeolites are carried out.

In all cases this temperature is higher than 40° C. and preferably between 40 and 100° C. It depends essentially on the nature of the zeolite and on the exchange ratio.

In general, the more the nitrogen isotherm is curved at 20° C., the more the zeolite will need to be heated to obtain an optimum performance. The curvature of the isotherm depends on the cations and increases with their number and their polarizing power.

The optimum temperature at which the process of the invention is used is defined as a function of the nature of the zeolite and of the other operating conditions of the PSA process, in particular the productivity, the recovery and the energy.

Thus, it is clear that beyond some temperature, for example above 200° C., the nitrogen adsorptivity of the zeolite will be too low to be usable.

Furthermore, heating of the zeolite is reflected in an additional investment in the plant which it will be necessary, for example, to insulate, and in an additional energy expenditure.

The overall economic balance needs to incorporate all these factors so as to determine the best compromise.

The heating may be carried out by any known means.

It will be possible, in particular, to employ electrical heating, a heat exchanger or a gas compression process.

A person skilled in the art will easily understand that the heat input can be effected equally well via the gas entering to be treated and via the column.

In favorable cases the heat will be provided by the compression of the gases, and this will result in a saving on heat exchangers.

If further heating is of help, the heating can be done by passing the gases over heating elements, by heating the wall of the spaces containing the adsorbent, by induction or by microwave heating.

A person skilled in the art will understand that the method of introducing heat is of little importance.

BRIEF DESCRIPTION OF THE DRAWINGS

EXAMPLES

Figure 1:
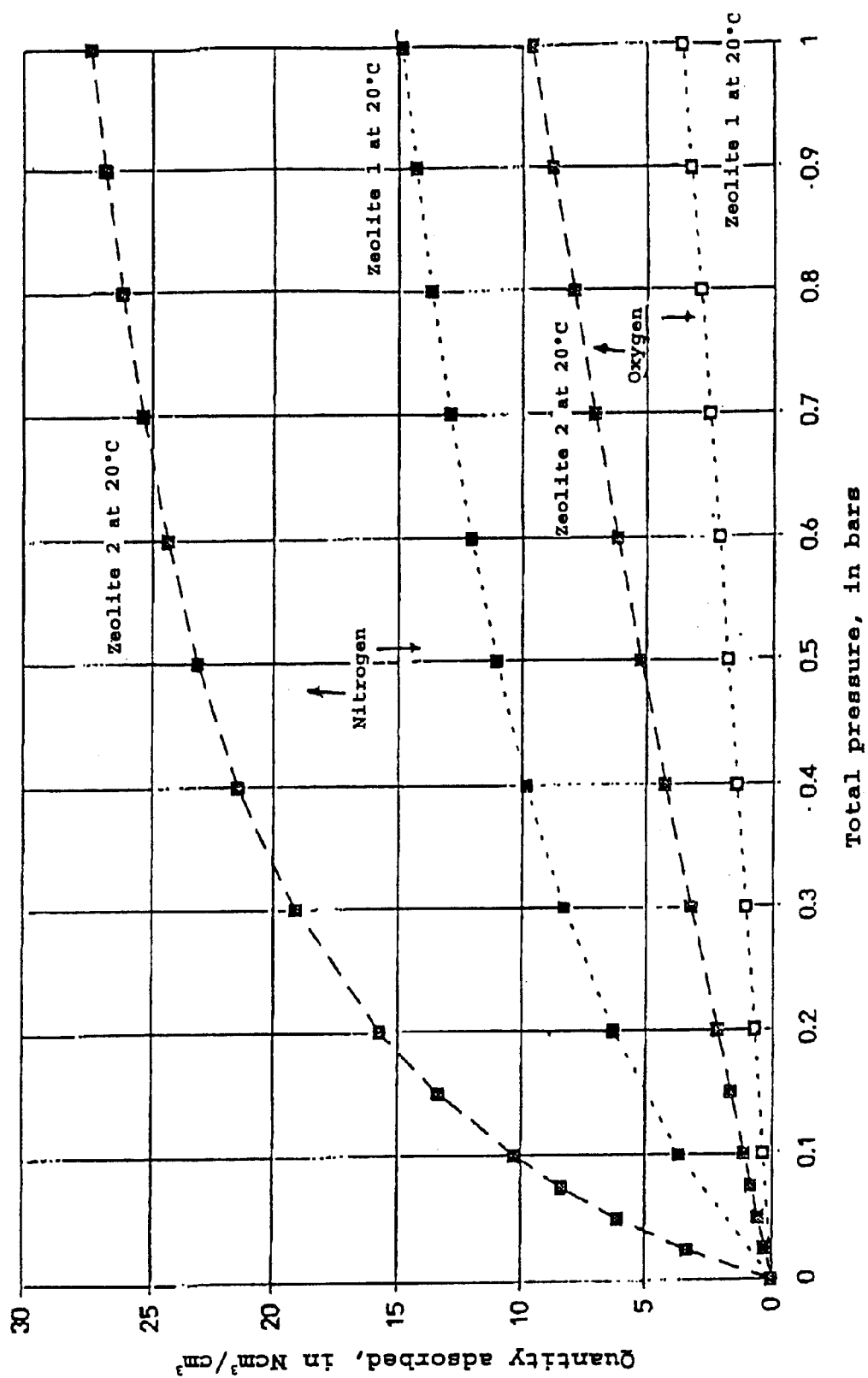
Figure 2:
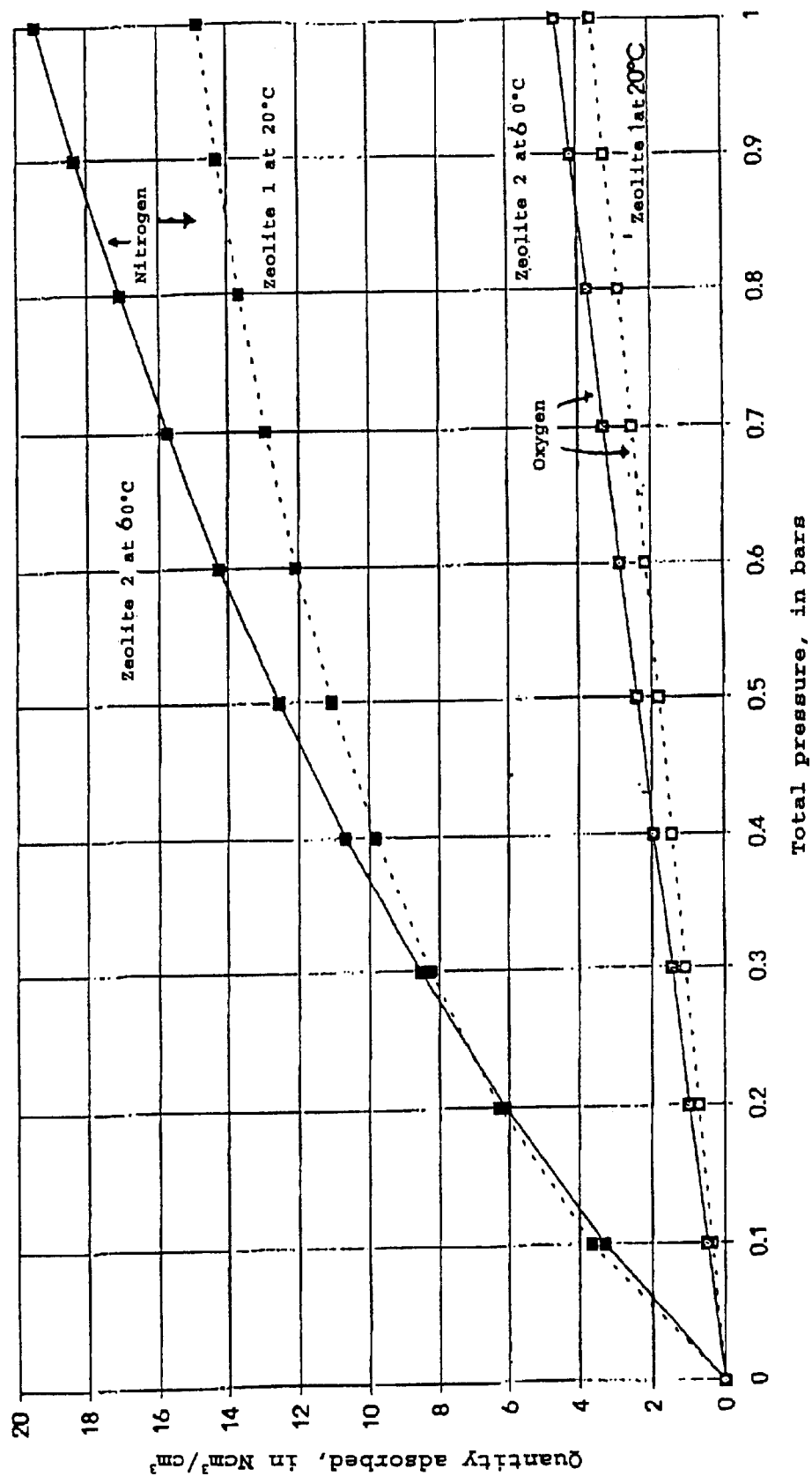
Figure 3:
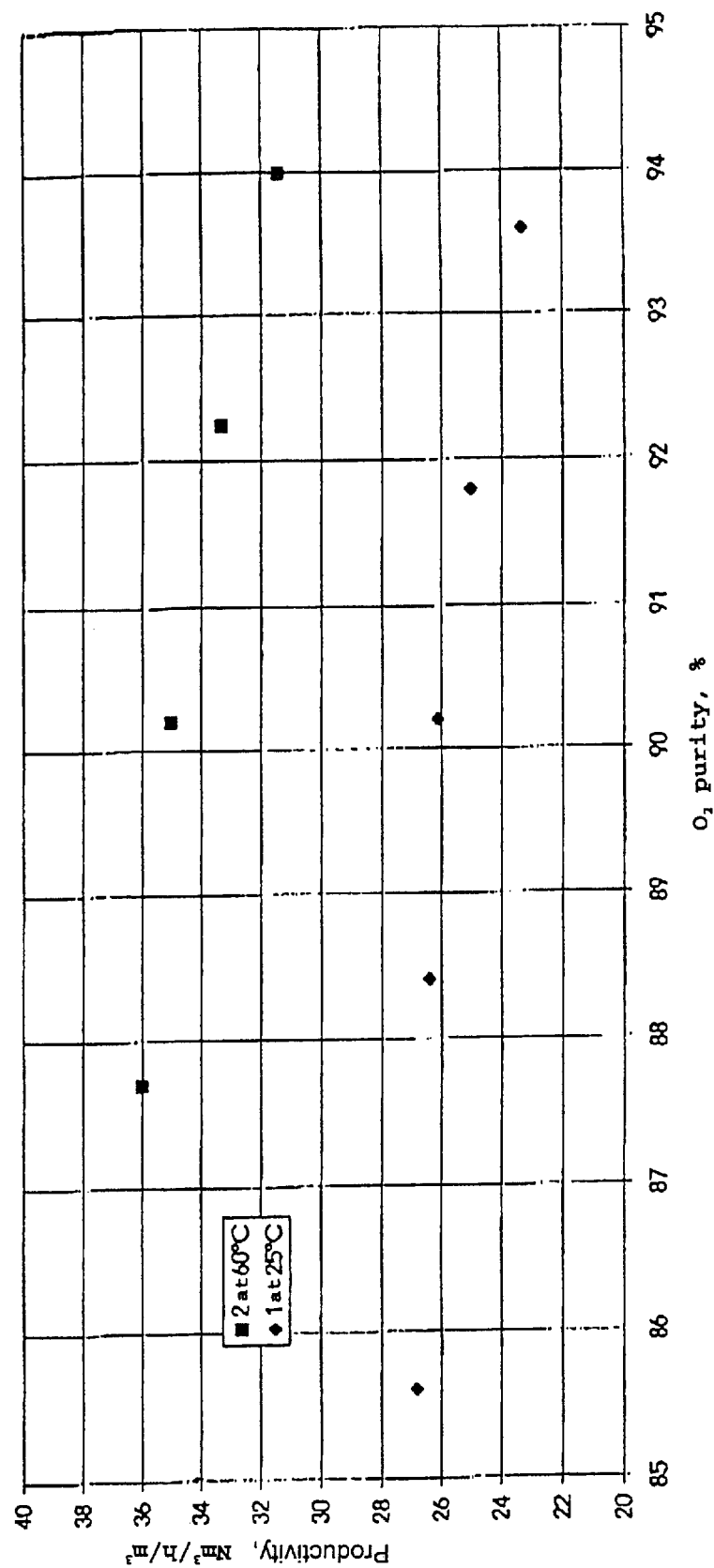
Figure 4:
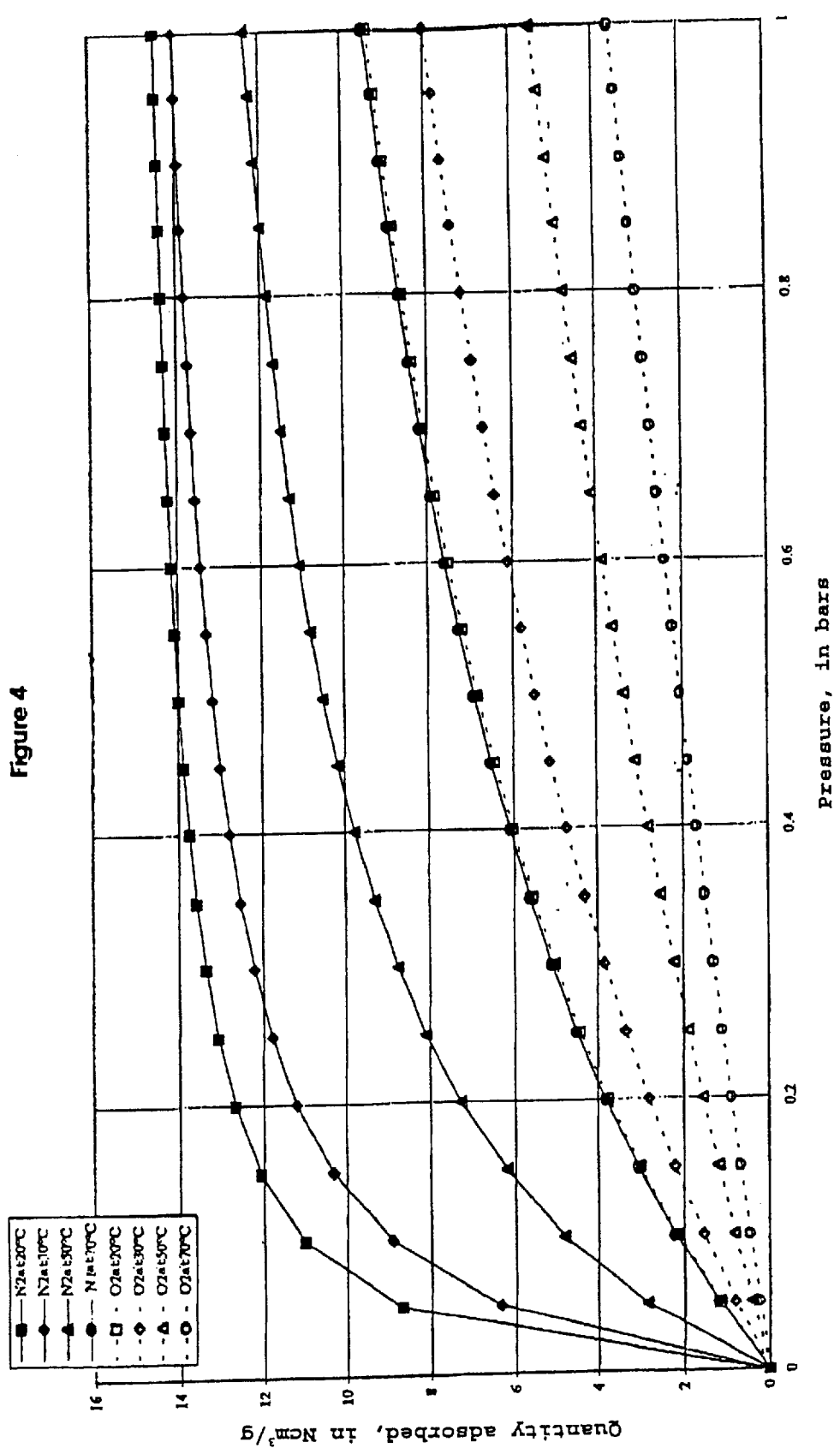
Figure 5:
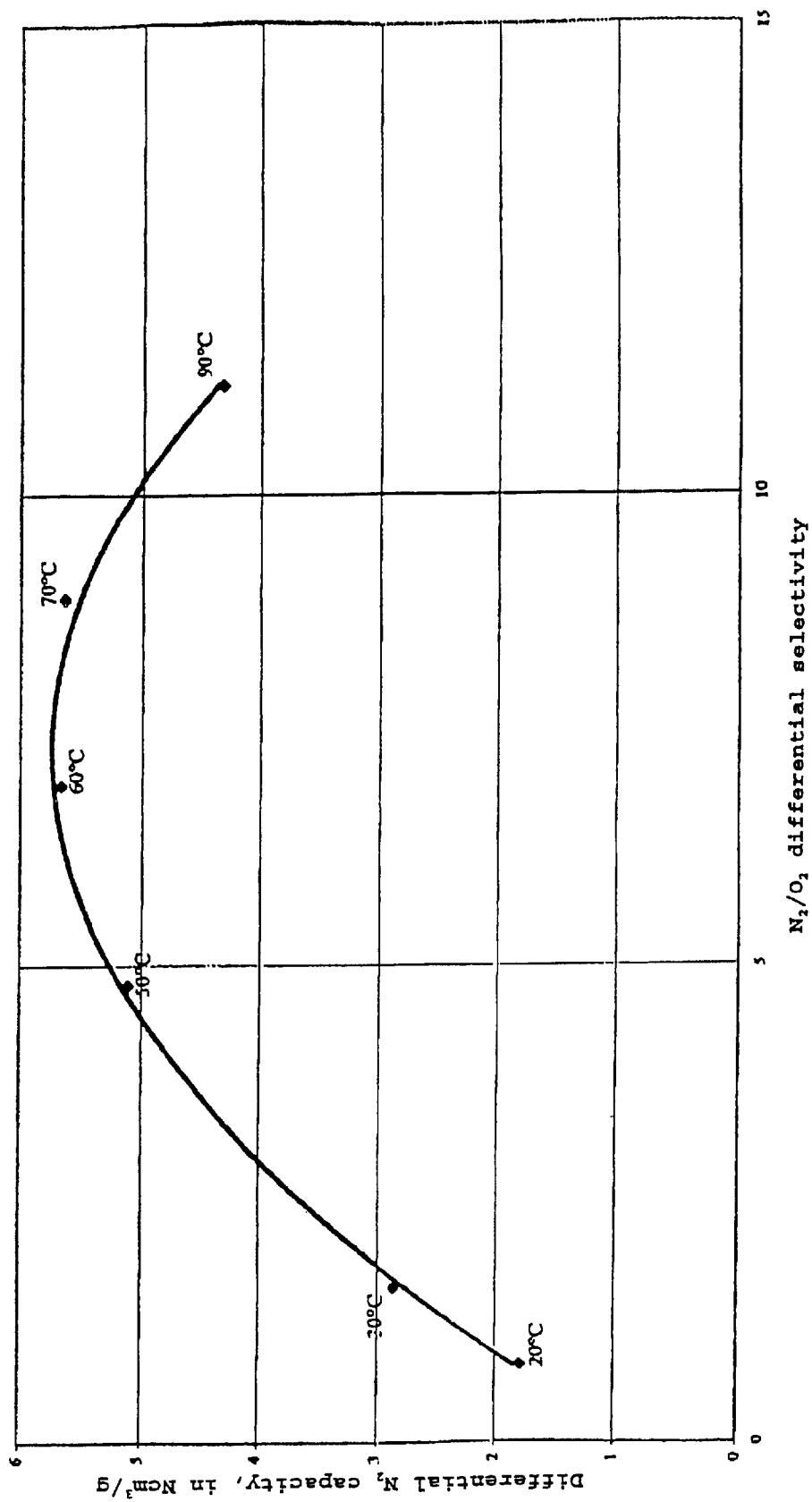

The examples which follow are given purely by way of illustrating the invention and its conditions of use. They are given with reference to FIGS. 1 to 4 which represent, respectively:

FIG. 1: the adsorption isotherms of nitrogen and of oxygen at 20° C. on the zeolites marked I and II in Example 1;

FIG. 2: the adsorption isotherms of nitrogen and oxygen on zeolite I at 20° C. and zeolite II at 60° C.;

FIG. 3: the productivity of a PSA cycle as a function of the purity of the oxygen, for zeolite II at 60° C. and zeolite I at 25° C.;

FIG. 4: the nitrogen adsorption isotherms at different temperatures on zeolite III described in Example 2;

FIG. 5: diagram representing the differential adsorptivity for nitrogen and the differential selectivity of zeolite III as a function of temperature.

Example 1

The zeolite I employed in this example is a zeolite of CaX type whose exchange ratio is 65% and the curvature parameter C, measured at 20° C. is 2.2.

Zeolite II is itself also a zeolite CaX but exhibiting an exchange ratio of 95% and the curvature parameter C, measured at 20° C., is 2.9.

A PSA cycle is carried out for producing oxygen from air, using 3 columns employed so as to perform a cycle including the following three stages:

a first stage of 30 seconds of production of oxygen at 1.1 b, during which air is passed into the entry of the column, and oxygen is recovered at the exit;

a second stage of decompression for 30 seconds to 0.26 b, during which the nitrogen is desorbed countercurrentwise;

a third stage of recompression for 30 seconds with oxygen to 1.1 b.

With reference to FIG. 1, it appears that the isotherm of adsorption of nitrogen at 20° C. on zeolite II is very curved and that, therefore, for the conditions, already mentioned, of $P_1=1.1$ b and $P_2=0.26$ b, the nitrogen breathing is lower than that of zeolite I, and the adsorbed quantity of oxygen is 2 times greater, which results in lower performance values in PSA in the case of zeolite II.

Zeolite II would be a priori rejected by a person skilled in the art because at 20° C. it exhibits a very curved nitrogen isotherm which produces mediocre performance values in a transatmospheric PSA cycle in which the high and low pressures are 1.1 b and 0.26 b.

FIG. 2 gives the nitrogen and oxygen adsorption isotherms of zeolite I at 20° C. and of zeolite II at 60° C.

In FIG. 2 it is seen that the isotherm of zeolite II at 60° C. is much less curved than it was at 20° C. and that it is very close to the isotherm of zeolite I at 20° C. Furthermore, the $N_2/O_2$ selectivities measured at 1 b and at 0.2 b are very near each other. This time, therefore, zeolite II compares favorably with zeolite I.

FIG. 3 gives the productivity yield for a PSA cycle as defined above, namely the volume of oxygen produced per hour and per $m^3$ of zeolite in the case of zeolite II at 60° C. and of zeolite I at 25° C.

In FIG. 3 it is seen that the performance values of the two zeolites I at 25° C. and II at 60° C. in an industrial PSA cycle are very different, with a clear advantage in the case of zeolite II.

Example 2

In this example a zeolite marked III is employed, which is a chabazite exchanged with Ca, described in U.S. Pat. No. 4,732,584. In U.S. Pat. No. 4,925,460 it is indicated that this zeolite is not suitable for a PSA process.

FIG. 4 gives the nitrogen adsorption isotherms at 20°, 30°, 50° and 70° C., obtained with this chabazite. The curvature parameter C, measured at 20° C., of this zeolite III is 4.4. The differences Δq in the quantities of nitrogen adsorbed at the high (1 b) and low (0.2 b) pressures of the PSA process are calculated for both these pressures.

These quantities are given in the table below:

| Temperature (° C.) | Δq ($Nm^3/g$) |
| --- | --- |
| 20 | 1.7 |
| 30 | 4.9 |
| 50 | 5.1 |
| 60 | 5.7 |
| 70 | 5.6 |
| 90 | 4.3 |

Zeolite III is therefore found to be completely advantageous in PSA from 30° C. onwards.

FIG. 5 shows the differential adsorptivity for nitrogen and the differential selectivity of zeolite III as a function of temperature. The optimum temperature of this zeolite III appears to be from approximately 60° C. to 70° C.

What is claimed is:

1. A process for separating nitrogen from a gas mixture containing nitrogen and at least one gas which is less polar than nitrogen, and employing a technique of differential adsorption of the gases, called PSA process, using an adsorbent of zeolite type, according to which the PSA process is used at a temperature greater than 50° C. by employing as adsorbent a zeolite whose nitrogen adsorption isotherm at 20° C. exhibits a curvature characterized by a parameter C defined by the formula:

$$C = \frac{P_1 q(P_2)}{P_2 q(P_1)}$$

where $q(P_1)$ denotes the quantity of nitrogen adsorbed at pressure $P_1$ and $q(P_2)$ that adsorbed at pressure $P_2$, and the pressures $P_1$ and $P_2$ are defined respectively from the high and low pressures of the PSA cycle in question, C being at least equal to 2.9.

2. The process as claimed in claim 1, wherein said PSA process is used at a temperature greater than 50 and less than or equal to 70° C.

3. The process as claimed in claim 1, wherein said gas mixture is air.

4. The process as claimed in claim 1, wherein said gas mixture includes hydrogen and nitrogen.

* * * * *